United States Patent
Kawata

(10) Patent No.: US 7,378,627 B2
(45) Date of Patent: May 27, 2008

(54) SEMICONDUCTOR LIGHT RECEIVING ELEMENT AND OPTICAL PICK-UP DEVICE HAVING THE SEMICONDUCTOR LIGHT RECEIVING ELEMENT

(75) Inventor: Seiji Kawata, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 11/607,013

(22) Filed: Dec. 1, 2006

(65) Prior Publication Data
US 2007/0125933 A1    Jun. 7, 2007

(30) Foreign Application Priority Data
Dec. 2, 2005    (JP)    ............... 2005-349276

(51) Int. Cl.
*G02B 27/40*    (2006.01)
(52) U.S. Cl. ............... 250/201.5; 250/214.1; 257/437; 369/120
(58) Field of Classification Search ............ 250/208.1, 250/214.1, 201.5; 369/112.01, 120, 122; 257/431–432, 436–437, 440
See application file for complete search history.

(56) References Cited

U.S. PATENT DOCUMENTS

2007/0023770 A1*    2/2007    Miyajima et al. ............. 257/88

FOREIGN PATENT DOCUMENTS

| JP | 2001-307361 | 11/2001 |
| JP | 2001-307362 | 11/2001 |
| JP | 2002-118281 | 4/2002 |
| JP | 2005136269 A * | 5/2005 |

\* cited by examiner

*Primary Examiner*—Kevin Pyo
(74) *Attorney, Agent, or Firm*—Young & Thompson

(57) ABSTRACT

A semiconductor light receiving element has: a semiconductor substrate; a plurality of photodiodes formed on the semiconductor substrate and configured to receive respective lights of different wavelengths; and an anti-reflection film provided on light receiving surfaces of the plurality of photodiodes. A structure of the anti-reflection film on at least one photodiode of the plurality of photodiodes is different from a structure of the anti-reflection film on another photodiode of the plurality of photodiodes.

8 Claims, 4 Drawing Sheets

SEMICONDUCTOR LIGHT RECEIVING ELEMENT AND OPTICAL PICK-UP DEVICE HAVING THE SEMICONDUCTOR LIGHT RECEIVING ELEMENT

BACKGROUND OF THE INVENTION

1. Field of the Invention

The present invention relates to a semiconductor light receiving element having a photodiode or a photodiode IC. In particular, the present invention relates to a semiconductor light receiving element installed in an optical pick-up device and receiving lights of a plurality of different wavelengths.

2. Description of the Related Art

An optical pick-up device is installed and used in an optical recording and reproducing apparatus such as a DVD player for playing video and audio, a DVD recorder for recording data to a DVD, and so on. Typically, the optical pick-up device is provided with a red laser diode for DVD and an infrared laser diode for CD. The red laser diode emits red light (wavelength: about 655 nm), and the infrared laser diode emits infrared light (wavelength: about 780 nm). The emitted light is irradiated on a DVD or a CD recording data, and the irradiated light is modulated and reflected by a surface portion of the DVD or the CD.

The optical pick-up device is further provided with a semiconductor light receiving element for receiving the reflected light from the DVD or the CD. FIG. 1 is a plan view schematically showing a configuration of a typical semiconductor light receiving element. As shown in FIG. 1, the semiconductor light receiving element has an infrared photodiode 1 for CD and a red photodiode 2 for DVD. The infrared photodiode receives the reflected infrared light, while the red photodiode receives the reflected red light. Moreover, as shown in FIG. 1, a plurality of infrared photodiodes 1 for CD may be provided in order to obtain a focusing function and a tracking function of the optical pick-up device in which the semiconductor light receiving element is installed. Generally, the semiconductor light receiving element is provided in the form of a photodiode IC (referred to as "PDIC") in which the above-mentioned photodiodes and an IC are integrated on one semiconductor substrate. The IC is configured to convert a current signal into a voltage signal, amplify the voltage signal and execute an arithmetic processing.

FIG. 2 is a cross-sectional view schematically showing a structure of the typical semiconductor light receiving element. The semiconductor light receiving element (PDIC) is formed on an N-type silicon substrate 4. The infrared photodiode 1 for CD and the red photodiode 2 for DVD are formed on the N-type silicon substrate 4. Each photodiode is a photoelectric conversion element having a PN junction. Moreover, an anti-reflection film (coating) is deposited on light receiving surfaces of the infrared photodiode 1 and the red photodiode 2 such that a signal conversion efficiency of the reflected lights from the DVD and the CD is improved. The anti-reflection film consists of a silicon dioxide film 8 formed on the light receiving surfaces and a silicon nitride film 9 formed on the silicon dioxide film 8. Such the anti-reflection film with the same structure is used in common for receiving the lights of two different wavelengths. In this case, the thickness of the anti-reflection film must be designed to deviate from an optimal value for at least one of the two different wavelengths. However, in the case of the two different wavelengths of 655 nm (for DVD) and 780 nm (for CD), there exists an appropriate design value of the thickness with which the signal conversion efficiency within a practically allowable range can be achieved for both of the two different wavelengths. By forming the anti-reflection film with the appropriate design value, it has been possible to efficiently receive the reflected lights of the two different wavelengths.

In recent years, a blue laser diode emitting blue light (wavelength: about 405 nm) has come into practical use, and a larger-capacity optical disk based on blue light has been produced. An optical recording and reproducing apparatus supporting such a larger-capacity optical disk has been provided with two optical pick-up devices: one is for CD and DVD, and the other is for blue light. That is to say, the blue light has been received by a dedicated PDIC. In order to reduce the product size and the product cost, it is desirable hereafter that a single optical pick-up device is capable of processing the lights of three different wavelengths (405 nm, 655 nm and 780 nm). In other words, it is desirable that a single PDIC is capable of receiving the lights of the three different wavelengths. In this case, a sufficient signal conversion efficiency must be achieved in the one PDIC for all of the three different wavelengths. According to the conventional structure shown in FIG. 2, the thickness of the anti-reflection film must be designed to deviate from an optimal value for at least one of the three different wavelengths. It is therefore difficult to achieve high signal conversion efficiency with regard to all of the three different wavelengths.

With respect to the foregoing, related techniques are disclosed in the following patent documents.

Japanese Laid-Open Patent Application JP-P2001-307361 discloses an optical pick-up device. The optical pick-up device has: first and second light sources respective of which emit first and second laser beams from emission points of not being located on the same optical axis; an objective lens which focuses the first and second laser beams emitted from the light sources on a recording surface of an optical recording medium; and a common light receiving element which receives return lights of the first and second laser beams reflected from the recording surface. The common light receiving element has a first light receiving surface for receiving the return light of the first laser beam and a second light receiving surface for receiving the return light of the second laser beam.

Japanese Laid-Open Patent Application JP-P2001-307362 also discloses an optical pick-up device. In the optical pick-up device, laser beams of different laser wavelengths emitted from a first laser element and a second laser element are selectively supplied to a single objective lens, and signals of a first recording medium and a second recording medium of different kinds are read out. The optical pick-up device is provided with a photo-detector in which a first light receiving unit and a second light receiving unit are formed on the same semiconductor substrate. The first light receiving unit receives the laser beam emitted from the first laser element and modulated at the first recording medium. The second light receiving unit receives the laser beam emitted from the second laser element and modulated at the second recording medium. A predetermined output of the first light receiving unit and a predetermined output of the second light receiving unit can be selectively derived from the same output terminal, so that the same output terminal of the photo-detector can be used in common.

Japanese Laid-Open Patent Application JP-P2002-118281 also discloses an optical pick-up device for multi-wavelength. The optical pick-up device has: a light emitting element configured to emit a laser beam; an imaging optical system configured to focus the laser beam on an optical disk medium; a light receiving element configured to receive the laser beam and convert the received laser beam into an electric current; and an amplifier circuit configured to amplify the photo-electric current generated by the light receiving element. Specifically, the optical pick-up device has: a first light emitting element for emitting a laser beam with wavelength of 700 to 800 nm for CD; a second light emitting element for emitting a laser beam with wavelength of 600 to 700 nm for DVD; a third light emitting element for emitting a laser beam with wavelength of 500 nm or less for a high-density DVD; a first light receiving element associated with the first light emitting element; a second light receiving element associated with the second light emitting element; and a third light receiving element associated with the third light emitting element. In the optical pick-up device, any two of or all of the first, second and third light receiving elements are integrated on the same silicon substrate. With regard to at least any of the integrated light receiving elements, one electrode is formed to extend to the surface of the silicon substrate through a buried layer and a contact hole. Depths of respective buried layers are different from each other.

SUMMARY OF THE INVENTION

An object of the present invention is to provide a semiconductor light receiving element that is capable of efficiently receiving lights of different wavelengths.

Another object of the present invention is to provide an optical pick-up device having a semiconductor light receiving element that is capable of efficiently receiving lights of different wavelengths.

In an aspect of the present invention, a semiconductor light receiving element is provided. The semiconductor light receiving element has: a semiconductor substrate; a plurality of photodiodes formed on the semiconductor substrate and configured to receive respective lights of different wavelengths; and an anti-reflection film provided on light receiving surfaces of the plurality of photodiodes. A structure of the anti-reflection film on at least one photodiode of the plurality of photodiodes is different from a structure of the anti-reflection film on another photodiode of the plurality of photodiodes.

The plurality of photodiodes may include: a blue photodiode configured to receive blue light; a red photodiode configured to receive red light; and an infrared photodiode configured to receive infrared light. In this case, a structure of the anti-reflection film on the blue photodiode is different from a structure of the anti-reflection film on the red photodiode and the infrared photodiode.

Specifically, the anti-reflection film on the blue photodiode is thicker than the anti-reflection film on the red photodiode and the infrared photodiode. It is preferable that the anti-reflection film on the blue photodiode is 35 nm to 80 nm thicker than the anti-reflection film on the red photodiode and the infrared photodiode.

The anti-reflection film may have: a silicon dioxide film formed on the light receiving surfaces to overlap the blue photodiode, the red photodiode and the infrared photodiode; a silicon nitride film formed on the silicon dioxide film to overlap the blue photodiode, the red photodiode and the infrared photodiode; and a silicon oxynitride film formed on the silicon nitride film to overlap only the blue photodiode. It is preferable that a thickness of the silicon oxynitride film is in a range from 35 nm to 80 nm.

In another aspect of the present invention, an optical pick-up device is provided. The optical pick-up device is provided with a laser diode unit and the above-mentioned semiconductor light receiving element. The laser diode unit has a plurality of laser diodes respective of which emit lights of different wavelengths. For example, the plurality of laser diodes includes: a blue laser diode configured to emit blue light; a red laser diode configured to emit red light; and an infrared laser diode configured to emit infrared light. The emitted lights are irradiated on an optical disk. The semiconductor light receiving element receives reflected lights from the optical disk.

According to the present invention, the single semiconductor light receiving element and the single optical pick-up device can efficiently receive the lights of different wavelengths.

In particular, it is possible by using the single semiconductor light receiving element of the present invention to achieve practically sufficient efficiency of photoelectric conversion with respect to any of blue light (wavelength: 405 nm), red light (wavelength: 655 nm) and infrared light (wavelength: 780 nm). It is therefore possible by using the single optical pick-up device of the present invention to deal with not only DVD and CD but also a blue-light-based optical disk. Thus, the product size and the product cost can be reduced.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

A semiconductor light receiving element according to the present invention has a plurality of photodiodes which are formed on the same semiconductor substrate and configured to receive respective lights of different wavelengths. Moreover, an anti-reflection film is provided on light receiving surfaces of the plurality of photodiodes respective of which are associated with the different wavelengths. The anti-reflection film has an optimized lamination structure and is formed in an integrated manner.

As will be described later, any of the plurality of photodiodes for the different wavelengths can achieve the photoelectric conversion with practically sufficient efficiency. An optical pick-up device provided with the above-mentioned semiconductor light receiving element can deal with not only DVD and CD but also a blue-light-based optical disk.

It is possible by using the single semiconductor light receiving element of the present invention to achieve practically sufficient efficiency of photoelectric conversion with respect to any of blue light (wavelength: 405 nm), red light (wavelength: 655 nm) and infrared light (wavelength: 780 nm). It is therefore possible by using the single optical pick-up device of the present invention to deal with not only DVD and CD but also a blue-light-based optical disk. Thus, the product size and the product cost can be reduced.

1. Semiconductor Light Receiving Element

Figure 1:
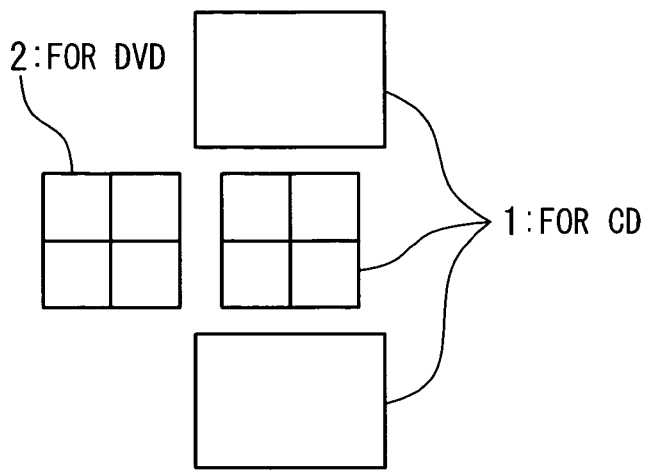
FIG. 1 is a plan view schematically showing a configuration of a conventional semiconductor light receiving element.
Figure 2:
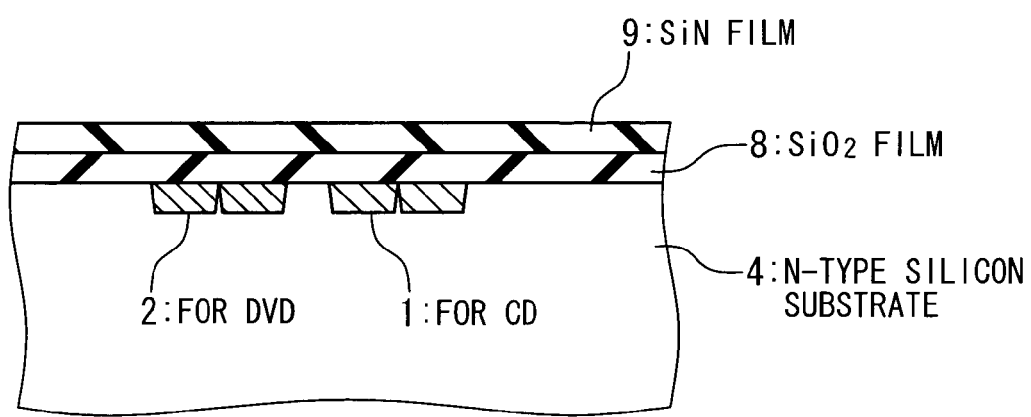
FIG. 2 is a cross-sectional view schematically showing a structure of the conventional semiconductor light receiving element.
Figure 3:
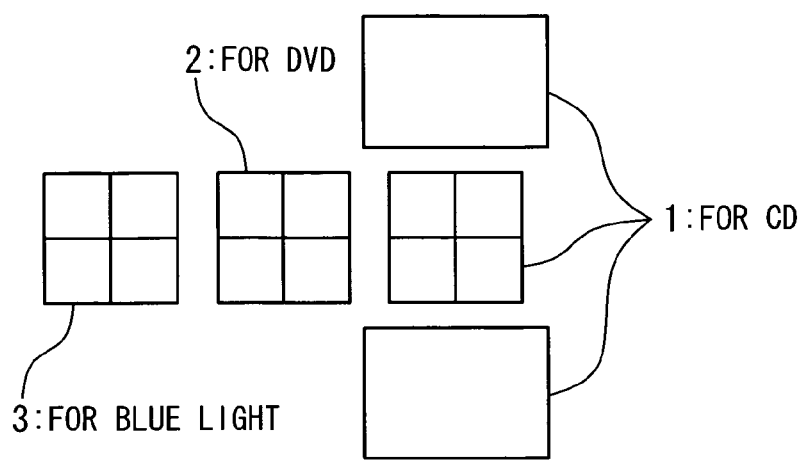
FIG. 3 is a plan view schematically showing a configuration of a semiconductor light receiving element according to an embodiment of the present invention.

FIG. 3 is a plan view schematically showing a configuration of a semiconductor light receiving element according to an embodiment of the present invention. More specifically, FIG. 3 illustrates the schematic configuration seen from the upper side of a light receiving surface of a photodiode unit of the semiconductor light receiving element.

As shown in FIG. 3, the semiconductor light receiving element has a plurality of photo diodes (1, 2 and 3) configured to receive respective lights of different wavelengths. With respect to one wavelength, a plurality of photo diodes (1) may be provided in order to obtain a focusing function and a tracking function of an optical pick-up device in which the semiconductor light receiving element is installed. The plurality of photo diodes (1, 2 and 3) are so designed as to efficiently convert the respective lights of different wavelengths into electric signals.

More specifically, the semiconductor light receiving element according to the present embodiment includes an infrared photodiode 1 for CD, a red photodiode 2 for DVD, and a blue photodiode 3 for a higher-density optical disk. The infrared photodiode 1 for CD is configured to receive infrared light (wavelength: 780 nm). The red photodiode 2 for DVD is configured to receive red light (wavelength: 655 nm). The blue photodiode 3 for the higher-density optical disk is configured to receive blue light (wavelength: 405 nm). The semiconductor light receiving element is provided in the form of a photodiode IC (PDIC) in which the above-mentioned photodiodes (1, 2 and 3) and an IC (not shown) are integrated on the same semiconductor substrate. The IC is configured to convert a current signal generated by each photodiode into a voltage signal, amplify the voltage signal and execute an arithmetic processing.

Figure 4:
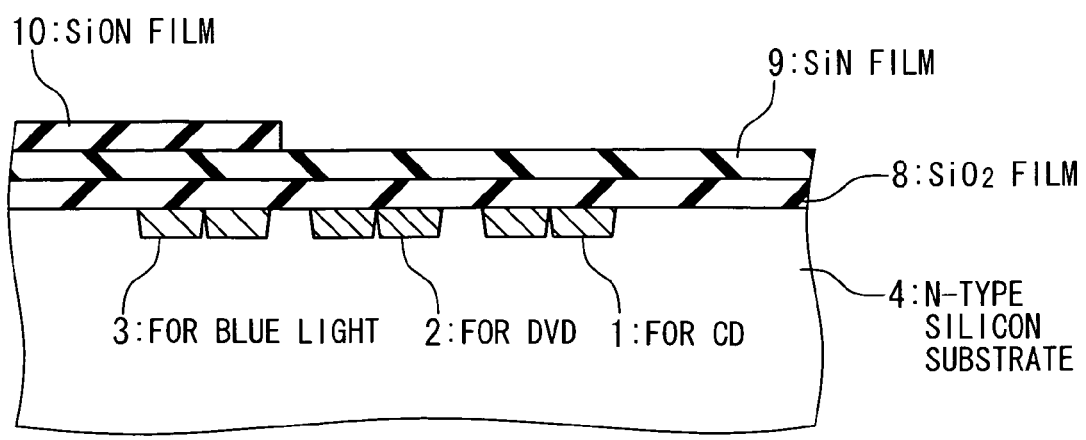
FIG. 4 is a cross-sectional view schematically showing a structure of the semiconductor light receiving element according to the embodiment of the present invention.

FIG. 4 is a cross-sectional view schematically showing a structure of the semiconductor light receiving element according to the present invention. The semiconductor light receiving element is formed on an N-type silicon substrate 4. The infrared photodiode 1 for CD, the red photodiode 2 for DVD and the blue photodiode 3 for blue light are formed on the N-type silicon substrate 4. Each photodiode is a photoelectric conversion element having a PN junction. Moreover, an anti-reflection film (coating) is deposited on light receiving surfaces of the infrared photodiode 1, the red photodiode 2 and the blue photodiode 3. The anti-reflection film is provided in the semiconductor light receiving element for the purpose of increasing incidence efficiency of the incident light and thus increasing conversion efficiency of the photoelectric conversion in respective photodiodes.

The anti-reflection film has an optimized lamination structure and is formed in an integrated manner. As shown in FIG. 4, the anti-reflection film according to the present invention has a silicon dioxide ($SiO_2$) film 8, a silicon nitride (SiN) film 9 and a silicon oxynitride (SiON) film 10. The refractive indices of the silicon dioxide film 8, the silicon nitride film 9 and the silicon oxynitride film 10 are 1.45, 2.0 and 1.8, respectively. The silicon dioxide film 8, whose thickness is 10 nm for example, is formed on the light receiving surfaces of the infrared photodiode 1, the red photodiode 2 and the blue photodiode 3. That is, the silicon dioxide film 8 is formed to overlap the infrared photodiode 1, the red photodiode 2 and the blue photodiode 3. The silicon nitride film 9, whose thickness is 80 nm for example, is formed on the above-mentioned silicon dioxide film 8. Similarly, the silicon nitride film 9 is formed to overlap the infrared photodiode 1, the red photodiode 2 and the blue photodiode 3. The silicon oxynitride film 10, whose thickness is 60 nm for example, is formed on a part of the above-mentioned silicon nitride film 9. More specifically, the silicon oxynitride film 10 is formed to overlap only the blue photodiode 3, as shown in FIG. 4. As described above, the anti-reflection film on the infrared photodiode 1 and the red photodiode 2 has a two-layer structure consisting of the silicon dioxide film 8 and the silicon nitride film 9. On the other hand, the anti-reflection film on the blue photodiode 3 has a three-layer structure consisting of the silicon dioxide film 8, the silicon nitride film 9 and the silicon oxynitride film 10. The structure of the anti-reflection film on the blue photodiode 3 is different from the structure of the anti-reflection film on the infrared photodiode 1 and the red photodiode 2. The anti-reflection film on the blue photodiode 3 is thicker than the anti-reflection film on the infrared photodiode 1 and the red photodiode 2 by the thickness of the silicon oxynitride film 10.

Figure 5:
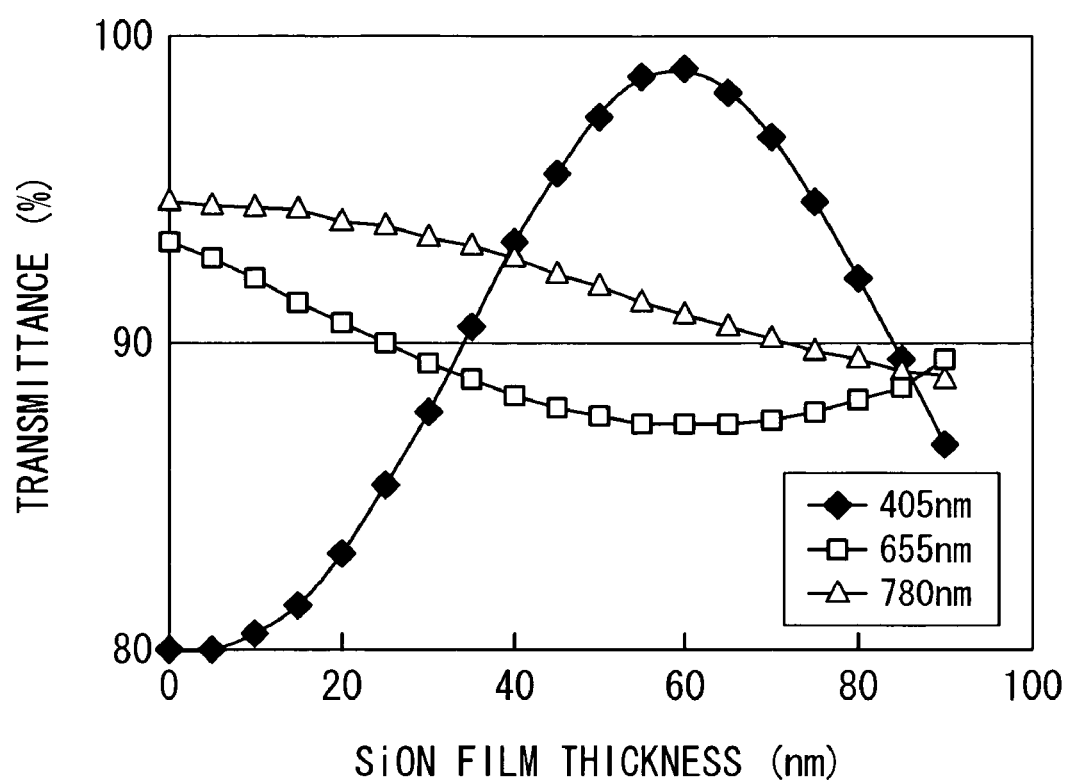
FIG. 5 is a diagram showing a relationship between light transmittance with respect to each photodiode in the semiconductor light receiving element and thickness of a silicon oxynitride film.

FIG. 5 shows a relationship between light transmittance with respect to each photodiode in the semiconductor light receiving element and the thickness of the silicon oxynitride film 10. The relationship was obtained through a computer simulation. The following points can be obviously seen from FIG. 5. In order to achieve sufficient transmittance more than 90% with respect to blue light (405 nm), the thickness of the silicon oxynitride film 10 is preferably designed to be in a range from 35 nm to 80 nm. In particular, when the thickness of the silicon oxynitride film 10 is 60 nm, the transmittance of blue light takes a maximum value near 100%. As for red light (655 nm) and infrared light (780 nm), transmittance of about 90% can be achieved regardless of the thickness of the silicon oxynitride film 10. The silicon oxynitride film 10 does not affect the transmittance of red light and infrared light so much. As described above, practically sufficient transmittance, namely, practically sufficient photoelectric conversion efficiency can be achieved for all the blue light (405 nm), red light (655 nm) and infrared light (780 nm). It can be said that the anti-reflection film according to the present embodiment is optimized by providing the silicon oxynitride film 10, such that the single semiconductor light receiving element can efficiently receive the lights of different wavelengths.

Basically, it is preferable that an optimal anti-reflection film is formed for every photodiode in consideration of every wavelength. However, the wavelength (655 nm) of red light associated with the red photodiode 2 and the wavelength (780 nm) of infrared light associated with the infrared photodiode 1 are relatively close to each other. Therefore, the anti-reflection film for the red photodiode 2 and the anti-reflection film for the infrared photodiode 1 can be identical to each other. In other words, the anti-reflection film consisting of the silicon dioxide film 8 and the silicon nitride film 9 can be shared by the red photodiode 2 for DVD and the infrared photodiode 1 for CD. Even in this case, the light transmittance of about 90% can be achieved for both the photodiodes 1 and 2, as shown in FIG. 5. The semiconductor light receiving element with high photoelectric conversion efficiency can be achieved. Moreover, when the same anti-reflection film is shared by the red photodiode 2 and the infrared photodiode 1, manufacturing efficiency of the semiconductor light receiving element is improved. According to the present embodiment, it is thus possible to provide the semiconductor light receiving element with high photoelectric conversion efficiency and with high manufacturing efficiency.

As described above, the single semiconductor light receiving element according to the present embodiment is provided with the plurality of photodiodes formed on the same semiconductor substrate and configured to receive respective lights of different wavelengths. Moreover, the anti-reflection film having an optimized lamination structure is formed on the light receiving surfaces of the plurality of photodiodes in the integrated manner. Furthermore, the anti-reflection film for the red photodiode 2 and the anti-reflection film for the infrared photodiode 1 are identical to each other. As a result, it is possible to achieve with high manufacturing efficiency the single semiconductor light receiving element that can executes the photoelectric conversion with practically sufficient efficiency for any of the lights of the different wavelengths.

It should be noted that the number of the photodiodes shown in FIG. 3 can be changed in accordance with ability and performance required for the optical pick-up device having the semiconductor light receiving element. The number, a placement angle and a shape of each photodiode can be designed appropriately. The arrangement pattern of the infrared photodiode 1 for CD, the red photodiode 2 for DVD and the blue photodiode 3 for blue light shown in FIG. 3 can be changed appropriately.

2. Optical Pick-Up Device

Figure 6:
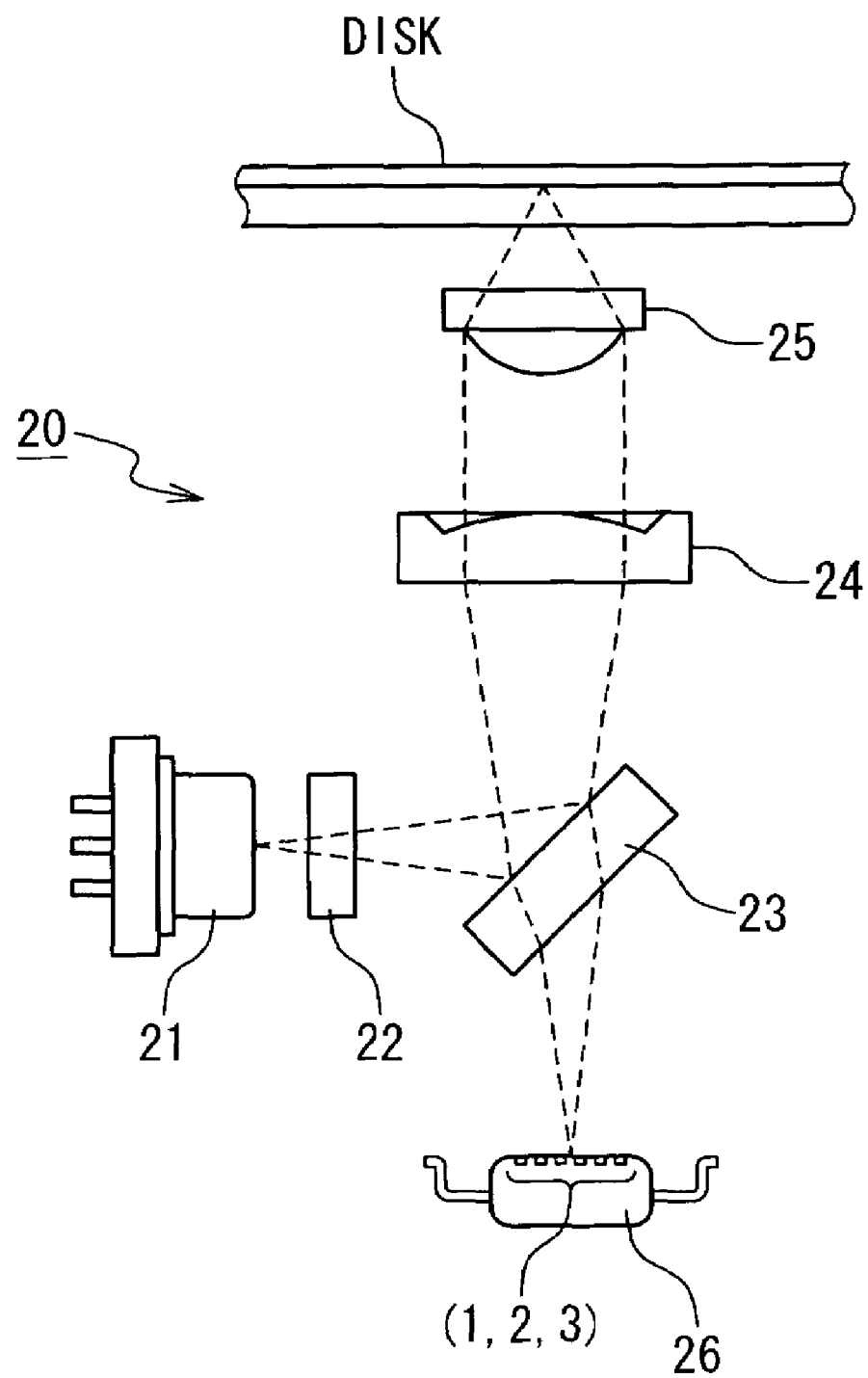
FIG. 6 is a schematic view illustrating an optical pick-up device provided with the semiconductor light receiving element according to the embodiment of the present invention.

An optical pick-up device according to the present embodiment is provided with the above-mentioned semiconductor light receiving element. FIG. 6 illustrates an example of the optical pick-up device 20 according to the present embodiment.

As shown in FIG. 6, the optical pick-up device 20 is provided with a laser diode unit 21, a diffractive element 22, a beam splitter 23, a collimator lens 24, an objective lens 25, and the above-mentioned semiconductor light receiving element 26 according to the present embodiment. The laser diode unit 21 has a plurality of laser diodes respective of which emit the lights of different wavelengths. In the present embodiment, the plurality of laser diodes includes a blue laser diode configured to emit blue light (405 nm), a red laser diode configured to emit red light (655 nm), and an infrared laser diode configured to emit infrared light (780 nm). The emitted lights from the laser diode unit 21 pass through the diffractive element 22 to reach the beam splitter 23. Then, the lights from the beam splitter 23 pass through the collimator lens 24 to reach the objective lens 25. Then, the lights are focused and irradiated on a recording surface of the optical disk (optical recording medium) such as a CD and a DVD. Then, the lights are reflected at the recording surface. The reflected lights (return lights) from the optical disk return to the beam splitter 23 through the objective lens 25 and the collimator lens 24. The reflected lights passing through the beam splitter 23 reaches the receiving surface of the semiconductor light receiving element 26. Thus, the semiconductor light receiving element 26 receives the incident lights.

As described above, the single optical pick-up device 20 according to the present embodiment has the semiconductor light receiving element shown in FIGS. 3 and 4. Therefore, the single optical pick-up device 20 can achieve practically sufficient efficiency of photoelectric conversion with respect to any of blue light (405 nm), red light (655 nm) and infrared light (780 nm). It is possible by using the single optical pick-up device 20 to program and read not only DVD and CD but also a blue-light-based optical disk. Thus, the manufacturing efficiency is improved, the product size is reduced, and the product cost is reduced.

It is apparent that the present invention is not limited to the above embodiment and may be modified and changed without departing from the scope and spirit of the invention.

What is claimed is:

1. A semiconductor light receiving element comprising:
   a semiconductor substrate;
   a plurality of photodiodes formed on said semiconductor substrate and configured to receive respective lights of different wavelengths; and
   an anti-reflection film provided on light receiving surfaces of said plurality of photodiodes,
   wherein a structure of said anti-reflection film on at least one photodiode of said plurality of photodiodes is different from a structure of said anti-reflection film on another photodiode of said plurality of photodiodes,
   wherein said plurality of photodiodes includes:
   a blue photodiode configured to receive blue light;
   a red photodiode configured to receive red light; and
   an infrared photodiode configured to receive infrared light,
   wherein a structure of said anti-reflection film on said blue photodiode is different from a structure of said anti-reflection film on said red photodiode and said infrared photodiode.

2. The semiconductor light receiving element according to claim 1,
   wherein said antireflection film on said blue photodiode is thicker than said antireflection film on said red photodiode and said infrared photodiode.

3. The semiconductor light receiving element according to claim 2,
   wherein said anti-reflection film on said blue photodiode is 35 nm to 80 nm thicker than said anti-reflection film on said red photodiode and said infrared photodiode.

4. The semiconductor light receiving element according to claim 1,
   wherein said anti-reflection film has:
   a silicon dioxide film formed on said light receiving surfaces to overlap said blue photodiode, said red photodiode and said infrared photodiode;
   a silicon nitride film formed on said silicon dioxide film to overlap said blue photodiode, said red photodiode and said infrared photodiode; and
   a silicon oxynitride film formed on said silicon nitride film to overlap only said blue photodiode.

5. The semiconductor light receiving element according to claim 4,
   wherein a thickness of said silicon oxynitride film is in a range from 35 nm to 80 nm.

6. An optical pick-up device comprising:
a laser diode unit having a plurality of laser diodes which emit lights of different wavelengths, said emitted lights being irradiated on an optical disk; and
a semiconductor light receiving element configured to receive reflected lights from said optical disk,
wherein said semiconductor light receiving element has:
a semiconductor substrate;
a plurality of photodiodes formed on said semiconductor substrate and configured to receive respective ones of said reflected lights of different wavelengths; and
an anti-reflection film provided on light receiving surfaces of said plurality of photodiodes,
wherein a structure of said antireflection film on at least one photodiode of said plurality of photodiodes is different from a structure of said anti-reflection film on another photodiode of said plurality of photodiodes;
wherein said plurality of laser diodes includes:
a blue laser diode configured to emit blue light;
a red laser diode configured to emit red light; and
an infrared laser diode configured to emit infrared light,
wherein said plurality of photodiodes includes:
a blue photodiode configured to receive blue light;
a red photodiode configured to receive red light; and
an infrared photodiode configured to receive infrared light,
wherein a structure of said anti-reflection film on said blue photodiode is different from a structure of said anti-reflection film on said red photodiode and said infrared photodiode.

7. The optical pick-up device according to claim 6,
wherein said anti-reflection film on said blue photodiode is thicker than said antireflection film on said red photodiode and said infrared photodiode.

8. The optical pick-up device according to claim 7,
wherein said anti-reflection film on said blue photodiode is 35 nm to 80 nm thicker than said anti-reflection film on said red photodiode and said infrared photodiode.

\* \* \* \* \*